United States Patent
Zhao et al.

(10) Patent No.: US 11,667,556 B2
(45) Date of Patent: Jun. 6, 2023

(54) METHOD FOR CONTROLLING DISCHARGING OF GLASS PLATE IN GLASS PLATE TEMPERING TECHNOLOGY PROCESS

(71) Applicant: LUOYANG LANDGLASS TECHNOLOGY CO., LTD., Luoyang (CN)

(72) Inventors: Yan Zhao, Luoyang (CN); Gaofeng Dou, Luoyang (CN); Chunwei Jiang, Luoyang (CN)

(73) Assignee: LUOYANG LANDGLASS TECHNOLOGY CO., LTD., Luoyang (CN)

( * ) Notice: Subject to any disclaimer, the term of this patent is extended or adjusted under 35 U.S.C. 154(b) by 773 days.

(21) Appl. No.: 16/636,903

(22) PCT Filed: Apr. 11, 2018

(86) PCT No.: PCT/CN2018/082667
§ 371 (c)(1),
(2) Date: Feb. 5, 2020

(87) PCT Pub. No.: WO2019/029180
PCT Pub. Date: Feb. 14, 2019

(65) Prior Publication Data
US 2020/0165154 A1    May 28, 2020

(30) Foreign Application Priority Data

Aug. 7, 2017   (CN) .............................. 201710667730

(51) Int. Cl.
*C03B 27/012* (2006.01)
*G05D 23/30* (2006.01)
(Continued)

(52) U.S. Cl.
CPC ........ *C03B 27/0417* (2013.01); *C03B 27/012* (2013.01); *G05D 7/00* (2013.01); *G05D 23/30* (2013.01)

(58) Field of Classification Search
CPC ... C03B 27/0417; C03B 27/012; C03B 29/08; G05D 7/00; G05D 23/30; Y02P 40/57
See application file for complete search history.

(56) References Cited

U.S. PATENT DOCUMENTS 4,071,344 A * 1/1978 Blausey, Jr. ........ C03B 27/0417
65/DIG. 13
6,172,336 B1 * 1/2001 Vehmas .................. C03B 29/08
65/273
(Continued)

FOREIGN PATENT DOCUMENTS

CN      102942300 A    2/2013
CN      203307211 U   11/2013
(Continued)

OTHER PUBLICATIONS

International Search Report (with partial translation) and Written Opinion dated Jun. 27, 2018, issued in corresponding International Patent Application No. PCT/CN2018/082667.

*Primary Examiner* — Kenneth M Lo
*Assistant Examiner* — Jonathan Michael Skrzycki
(74) *Attorney, Agent, or Firm* — Morgan, Lewis & Bockius LLP

(57) ABSTRACT

A method for controlling discharging of a glass plate in a glass plate tempering technology process is provided. After a glass plate is fed into a heating furnace, a monitoring unit monitors and performs filtering on a working parameter of a heating element in real time, and then transmits the filtered working parameter to a control unit. The control unit compares the filtered working parameter with a specified threshold. After the working parameter reaches a maximum value (Continued)

or a minimum value, and then reaches the specified threshold during a subsequent change, the control unit sends an instruction to a drive mechanism. The drive mechanism acts to move the glass plate out of the heating furnace directly or after a time delay, so as to complete a glass plate heating process. The present disclosure changes a conventional time-based control method, reduces energy consumption, and improves quality of a tempered glass.

18 Claims, 3 Drawing Sheets

(51) Int. Cl.
*C03B 27/04* (2006.01)
*G05D 7/00* (2006.01)

(56) References Cited

U.S. PATENT DOCUMENTS

2009/0199594 A1* 8/2009 Abbott .................... C03B 35/14
65/161
2015/0048717 A1 2/2015 Davis

FOREIGN PATENT DOCUMENTS

| CN | 105621871 | A | * | 6/2016 |
|----|-----------|---|---|--------|
| CN | 105621871 | A |   | 6/2016 |
| CN | 106132889 | A |   | 11/2016 |
| CN | 107500519 | A |   | 12/2017 |
| CN | 107515637 | A |   | 12/2017 |
| CN | 107562024 | A |   | 1/2018 |

* cited by examiner

METHOD FOR CONTROLLING DISCHARGING OF GLASS PLATE IN GLASS PLATE TEMPERING TECHNOLOGY PROCESS

CROSS-REFERENCED APPLICATIONS

This application is a U.S. national phase entry under 35 U.S.C. § 371 from PCT International Application No. PCT/CN2018/082667 filed on Apr. 11, 2018, which is based upon and claims the benefit of priority from the prior Chinese Patent Application No. 201710667730.0 filed on Aug. 7, 2017. The entire contents of the above applications are incorporated herein by reference.

TECHNICAL FIELD

The present disclosure relates to a glass plate production technology, and in particular, to a method for controlling discharging of a glass plate in a glass plate tempering technology process.

BACKGROUND TECHNOLOGY

In a tempering technology of a glass plate, the glass plate is first heated to a softening temperature (for example, 600° C. to 700° C.), and then is rapidly cooled, to complete tempering. Heating the glass plate is an important technology control process. In the prior art, a heating process of the glass plate is usually controlled by a heating time, that is, the heating time of the glass plate is estimated by multiplying a thickness of the glass plate by a time coefficient, and the glass plate is moved out of the furnace after a specified heating time is reached. Such a manner of controlling the glass plate heating process by relying on experience has the following technical disadvantages: 1. It is not easy to accurately control a heating temperature of the glass plate, and an insufficient heating temperature phenomenon or an over-burning phenomenon usually occurs on the glass plate, directly exerting disadvantageous impact on tempering quality of the glass plate. For example, tempering stress does not reach a standard, or flatness of the glass plate is unqualified. 2. An excessive heating time may result in some energy waste and increase production costs. 3. Experience and quality of operators are heavily relied on. This not only increases labor costs, but is also adverse to improvement of a qualified rate of products and long-term stability of quality.

A Chinese patent application discloses a glass plate heating method in a glass plate tempering process, and provides that: several temperature sensors for detecting a temperature of a glass plate in a heating section are disposed in the heating section of a glass plate tempering furnace. When the temperature sensors detect that the temperature of the glass plate reaches or approaches a specified temperature in a heating process of the glass plate, the glass plate is moved out of the heating section. Although the method resolves the technical disadvantage caused by controlling the heating process of the glass plate by relying on the heating time and the operation experience, the following technical problems still exist: 1. In the heating process of the glass plate, heating rates of different parts of the glass plate are inconsistent, and the monitoring method is a non-contact monitoring. Consequently, it is difficult for the temperature sensor to accurately monitor an actual temperature of the glass plate, and a heating control effect is still not satisfactory. 2. To monitor the temperature of the glass plate, the temperature sensor needs to stay in a high temperature environment for a long time. Reliability of a detection result may be affected by a furnace temperature in an environment, and consequently it is different to distinguish whether a detected temperature is the furnace temperature or the temperature of the glass plate. 3. Because the glass plate in the heating furnace is in a moving state, the temperature sensor cannot track a temperature at a same point of the glass plate in real time, and a detected temperature cannot completely reflect an actual temperature of the glass plate.

SUMMARY

An objective of the present disclosure is to provide a method for controlling discharging of a glass plate in a glass plate tempering technology process to resolve a problem in the prior art that: when a surface temperature of a glass plate is directly monitored by using a sensor, the sensor is likely to be affected by an ambient temperature in a heating furnace, resulting in inaccurate measurement, and that the glass plate may be discharged too early or too late, consequently leading to a largely increased waste rate of the glass plate, and waste of resources.

The technical solution adopted by the present disclosure to resolve the foregoing technical problem is that:

A method for controlling discharging of a glass plate in a glass plate tempering technology process is provided, which can be used for controlling a discharging action of a glass plate after a heating process is completed in a heating furnace. After the glass plate is fed into the heating furnace, a monitoring unit monitors a working parameter of a heating element in real time, performs filtering on the working parameter of the heating element, and then transmits the filtered working parameter of the heating element to a control unit. The control unit compares the received working parameter of the heating element with a specified threshold. After the working parameter of the heating element reaches a maximum value or a minimum value, when the working parameter reaches the specified threshold during a subsequent change, the control unit sends an instruction to a drive mechanism. The drive mechanism acts to directly move the glass plate out of the heating furnace or move the glass plate out of the heating furnace after a time delay, so as to complete a glass plate heating process.

The control unit is a Programmable Logic Controller ("PLC") or a Personal Computer ("PC").

An electric heating element is adopted as the heating element, and the working parameter of the heating element is a total power of the heating element in the heating furnace. After the glass plate is fed into the heating furnace, the monitoring unit monitors the total power of the heating element in real time, performs filtering on the total power of the heating element, and then transmits the filtered total power of the heating element to the control unit to compare the filtered total power with a specified threshold $W_1$. After the total power of the heating element reaches the maximum value, when the total power is less than or equal to the threshold $W_1$ during a falling process, the control unit sends an instruction to the drive mechanism; and the drive mechanism acts to directly move the glass plate out of the heating furnace or move the glass plate out of the heating furnace after a time delay, so as to complete the glass plate heating process.

The monitoring unit is an electricity meter, and the total power of the heating element is monitored by using the electricity meter.

The threshold is $W_1 = W_0 \cdot K$, where $K$ is a correction coefficient with a value range that $0.9 \leq K \leq 1.1$, and $W_0$ is a total heating power of the heating element when the heating furnace reaches a working temperature in a no-load state at room temperature. To determine $W_0$, the heating furnace needs to be run in the no-load state, and the detected total heating power when the heating furnace reaches the working temperature needs to be measured a plurality of times, for example, 5 times, to obtain an average of a plurality of measurement results.

An electric heating element is adopted as the heating element, and the working parameter of the heating element is a total current value of the heating element in the heating furnace. After the glass plate is fed into the heating furnace, the monitoring unit monitors a real-time total current value of the heating element, performs filtering on the total current value of the heating element, and then transmits the filtered total current value to the control unit to compare the filtered total current value with a specified threshold $A_1$. After the total current value of the heating element reaches the maximum value, when the total current value is less than or equal to the threshold $A_1$ during a falling process, the control unit sends an instruction to the drive mechanism of the heating furnace; and the drive mechanism acts to directly move the glass plate out of the heating furnace or move the glass plate out of the heating furnace after a time delay, so as to complete the glass plate heating process.

The monitoring unit is an ammeter, and the total current value of the heating element is monitored by using the ammeter.

The threshold is $A_1 = A_0 \cdot K$, where K is a correction coefficient with a value range that $0.9 \leq K \leq 1.1$, and $A_0$ is a total current value of the heating element when the heating furnace reaches a working temperature in a no-load state at room temperature. To determine $A_0$, the heating furnace needs to be run in the no-load state, and the detected total current value when that the heating furnace reaches the working temperature needs to be measured a plurality of times, for example, 5 times, to obtain an average of a plurality of measurement results.

Either an electric heating element or a gas heating element is adopted as the heating element, and the working parameter of the heating element is a turn-on ratio of all heating elements in the heating furnace; wherein the turn-on ratio of the heating element is a percentage of a quantity of the heating elements in a working state in a quantity of all heating elements. After the glass plate is fed into the heating furnace, the monitoring unit monitors the turn-on ratio of the heating element in real time, performs filtering on the detected turn-on ratio, and then transmits the filtered turn-on ratio to the control unit to compare the filtered turn-on ratio with a threshold $K_1$. After the turn-on ratio of the heating element reaches the maximum value, when the turn-on ratio is less than or equal to the threshold $K_1$ during a falling process, the control unit sends an instruction to the drive mechanism; and the drive mechanism acts to directly move the glass plate out of the heating furnace or move the glass plate out of the heating furnace after a time delay, so as to complete the glass plate heating process.

The turn-on ratio is calculated by running a formula: the quantity of the heating elements in the working state/the total quantity of the heating elements, after the quantity of the heating elements in the working state is detected by the monitoring unit.

The threshold is $K_1 = K_0 \cdot K$, where K is a correction coefficient with a value range that $0.9 \leq K \leq 1.1$, and $K_0$ is a turn-on ratio of the heating element when the heating furnace reaches a working temperature in a no-load state at room temperature. To determine $K_0$, the heating furnace needs to be run in the no-load state, and the detected turn-on ratio when the heating furnace reaches the working temperature needs to be measured a plurality of times, for example, 5 times, to obtain an average of a plurality of measurement results.

Either an electric heating element or a gas heating element is adopted as the heating element, and the working parameter of the heating element is a turn-off ratio of all heating elements in the heating furnace; wherein the turn-off ratio of the heating element is a percentage of a quantity of the heating elements in an off state in a quantity of all heating elements. After the glass plate is fed into the heating furnace, the monitoring unit monitors the turn-off ratio of the heating element in real time, performs filtering on the detected turn-off ratio of the heating element, and then transmits the filtered turn-off ratio to the control unit to compare the filtered turn-off ratio with a threshold $D_1$. After the turn-off ratio of the heating element reaches the minimum value, when the turn-off ratio is greater than or equal to the threshold $D_1$ during a rising process, the control unit sends an instruction to the drive mechanism of the heating furnace; and the drive mechanism acts to directly move the glass plate out of the heating furnace or move the glass plate out of the heating furnace after a time delay, so as to complete the glass plate heating process.

The turn-off ratio is calculated by running a formula: 1−(the quantity of the heating elements in the working state/the total quantity of the heating elements), after the quantity of the heating elements in the working state is detected by the monitoring unit.

The threshold is $D_1 = D_0 \cdot K$, where K is a correction coefficient with a value range that $0.9 \leq K \leq 1.1$, and $D_0$ is a turn-off ratio of the heating element when the heating furnace reaches a working temperature in a no-load state at room temperature. To determine $D_0$, the heating furnace needs to be run in the no-load state, and the detected turn-off ratio when the heating furnace reaches the working temperature needs to be measured a plurality of times, for example, 5 times, to obtain an average of a plurality of measurement results.

A gas heating element is adopted as the heating element, and the working parameter of the heating element is a gas flow value of the gas heating element in the heating furnace. After the glass plate is fed into the heating furnace, the monitoring unit monitors the gas flow value of the gas heating element in real time, performs filtering on the gas flow value, and then transmits the filtered gas flow value to the control unit to compare the filtered gas flow value with a specified threshold $R_1$. After the gas flow value of the heating element reaches the maximum value, when the gas flow value is less than or equal to the threshold $R_1$ during a falling process, the control unit sends an instruction to the drive mechanism; and the drive mechanism acts to directly move the glass plate out of the heating furnace or move the glass plate out of the heating furnace after a time delay, so as to complete the glass plate heating process.

The monitoring unit is a gas flowmeter, and the gas flow value of the heating element is monitored by using the gas flowmeter.

The threshold is $R_1 = R_0 \cdot K$, where K is a correction coefficient with a value range that $0.9 \leq K \leq 1.1$, and $R_0$ is a gas flow value of the heating element when the heating furnace reaches a working temperature in a no-load state at room temperature. To determine $R_0$, the heating furnace needs to be run in the no-load state, and the detected gas flow value when the heating furnace reaches the working temperature needs to be measured a plurality of times, for example, 5 times, to obtain an average of a plurality of measurement results.

The threshold is input into the control unit manually through a human-machine interface. According to a corresponding standard threshold determined based on no-load running, a corresponding correction coefficient is selected. K is selected according to an ambient temperature. A method of selecting the correction coefficient K is described below by using the total power of the heating element as an example. If the ambient temperature is higher than room temperature, K is usually set to be less than 1. Because if an external temperature is too high, heat dissipation of the heating furnace is reduced, heat dissipated to the outside is reduced in the no-load state, thereby reducing heat generated by the heating element. As a result, the threshold needs to be reduced. If the ambient temperature is lower than room temperature, K is usually set to be greater than 1, because if an external temperature is too low, heat dissipation of the heating furnace is increased, further the heat dissipated to the outside is increased in the no-load state, thereby increasing the heat generated by the heating element. As a result, the threshold needs to be increased. If an ambient temperature is equal to room temperature, K is set to 1, that is, the threshold is not adjusted. After the correction coefficient is determined, and a corresponding standard threshold is corrected, a corresponding threshold is determined, and then the threshold is input into the control unit by an operator.

The filtering is digital filtering or analog filtering.

The "working temperature" in the present disclosure refers to a specified heating temperature when the heating furnace heats different types of glass plates in a glass plate tempering technology. The specified heating temperature can be adjusted according to the type of the glass plate. This is common knowledge of a person skilled in the art, and details are not described herein again.

The "reach the specified threshold" means that the working parameter of the heating element is less than or equal to the threshold in a falling process; or the working parameter of the heating element is greater than or equal to the threshold in a rising process.

Advantageous effects of the present disclosure are as follows:

1. The present disclosure breaks the traditional control method based on a time in the technical field, by monitoring the working parameter of the heating element (the total power, a total current, the turn-on ratio or the turn-off ratio of the heating element, or the gas flow value of the gas heating element) in the heating furnace running process in real time. The method replaces the conventional method of directly monitoring an internal temperature of the heating furnace. The monitoring method can avoid a problem of inconvenient measurement of a temperature of the glass plate having a large area, and electrical information of the heating element is easily monitored. Therefore, the glass plate is observed by monitoring an information change of the heating element. Because the glass plate is heated in a constant-temperature heating furnace, and the heating furnace is kept at a constant temperature, heat generated by the heating element is transferred to the glass plate. As a result, the heat required for a temperature change of the glass plate is completely provided by a change of a working state of the heating element. The indirectly monitoring information of the heating element can control the heating process of the glass plate more scientifically and accurately, thereby accurately determining a discharging time of the glass plate, so that not only energy consumption in a production process of tempered glass plate is reduced, but also quality of a finished product of the tempered glass plate is improved.

2. The heating process no longer relies on experience and quality of an operator. Not only labor costs reduced, but also a database may be set to be an automated comparison database or a manual comparison database to make equipment more intelligent and an operation simpler and more convenient. This is advantageous to the stability of the production technology and production quality.

3. The system has a simple structure, avoids directly monitoring the glass plate at a high temperature state, and has high reliability.

DETAILED DESCRIPTION

The embodiments of the present disclosure are described below in detail with reference to the accompanying drawings.

Embodiment 1

Figure 1:
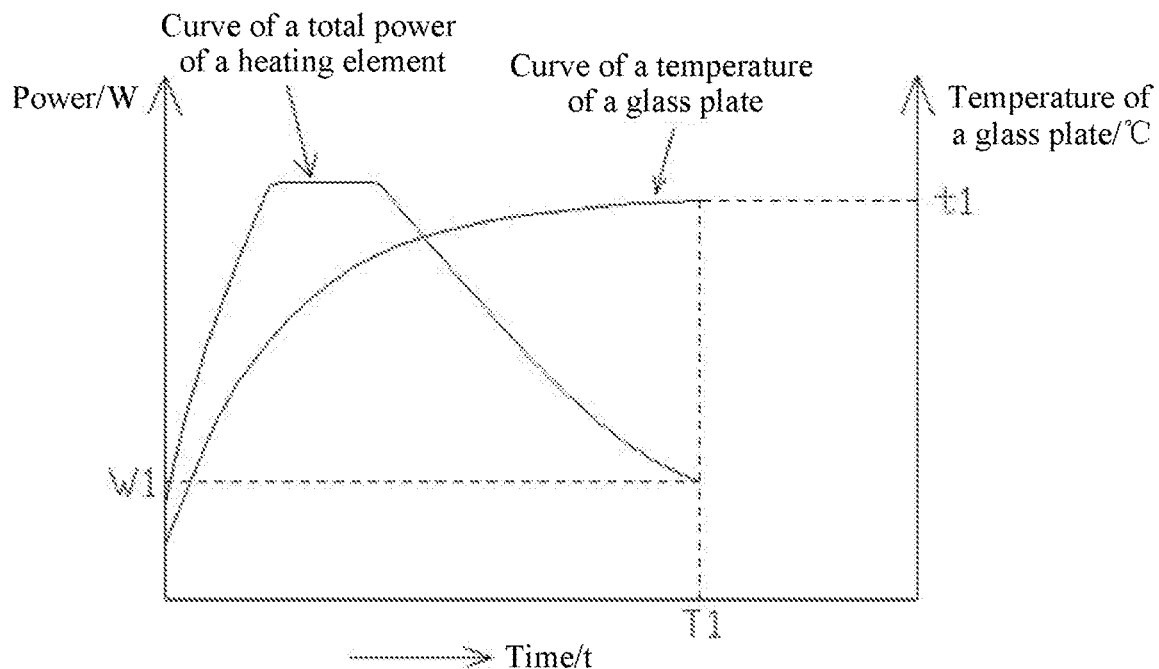
FIG. 1 is a variation curve diagram of total power of an electric heating element according to the present disclosure.

As shown in FIG. 1, using a total power of an electric heating element as an example, a control process of a heating control method of the present disclosure is as follows:

First, a to-be-used heating furnace is determined, a working temperature of the heating furnace is adjusted according to a type of a to-be-heated glass plate (for example, a low-radiation coated glass plate or white glass) and thickness information. The heating furnace is run to reach the working temperature in a no-load state where an ambient temperature is room temperature. A total power value of the heating element in the state is monitored, five total power values at different moments are measured, and an average of the five values is obtained, where the average is a standard threshold $W_0$. An ambient temperature is measured, and a correction coefficient is determined with reference to a correction coefficient table (a correction coefficient K in the table is obtained by using the following calculation method: respectively monitoring total power values of the heating element when the heating furnace is run to reach the working temperature in a no-load state at different ambient temperatures, and dividing each total power value by $W_0$). A threshold $W_1$ is calculated according to the correction coefficient K and $W_0$ through a formula: $W_1 = W_0 \cdot K$, and the operator inputs the threshold $W_1$ into a control unit through a human-machine interface.

After the glass plate is fed into the heating furnace, the total power of the heating element is monitored by an electricity meter in real time. Because the glass plate starts to absorb heat when entering the heating furnace from a lower temperature state, a temperature in the heating furnace is lowered at this moment. To keep a constant-temperature working state of the heating furnace, a quantity of heating elements in a working state is increased to provide more heat. In this case, a total heating power of the heating element increases rapidly, reaches a maximum value within a specific period of time, and then remains unchanged. As the temperature of the glass plate is gradually increased, a difference between the temperature of the glass plate and temperature in the furnace is gradually reduced. In this case, a speed at which the glass plate absorbs the heat in the heating furnace is reduced, the temperature of the glass plate in the heating furnace tends to be constant, a quantity of the heating elements in the working state is gradually reduced, and the total power of the heating element is gradually reduced. When the electricity meter connected to the heating element detects that the total power of the heating element is less than or equal to a specified threshold $W_1$ again after reaching a maximum value, the detected total power of the heating element in a falling process is less than or equal to the specified threshold $W_1$. That is, when the total heating power detected is less than or equal to the specified threshold $W_1$ for a second time, a corresponding moment T1 when the glass plate is heated to a suitable temperature t1 that satisfies the tempering technology is determined, as shown in FIG. 1 (a curve in the figure is a curve diagram after filtering is performed on a data curve according to a change of the detected total power of the heating element). That is, at a moment T1, a control unit sends an instruction to a drive mechanism to move the glass plate out of the heating furnace, so as to complete the heating process and enter a next procedure.

Embodiment 2

Figure 2:
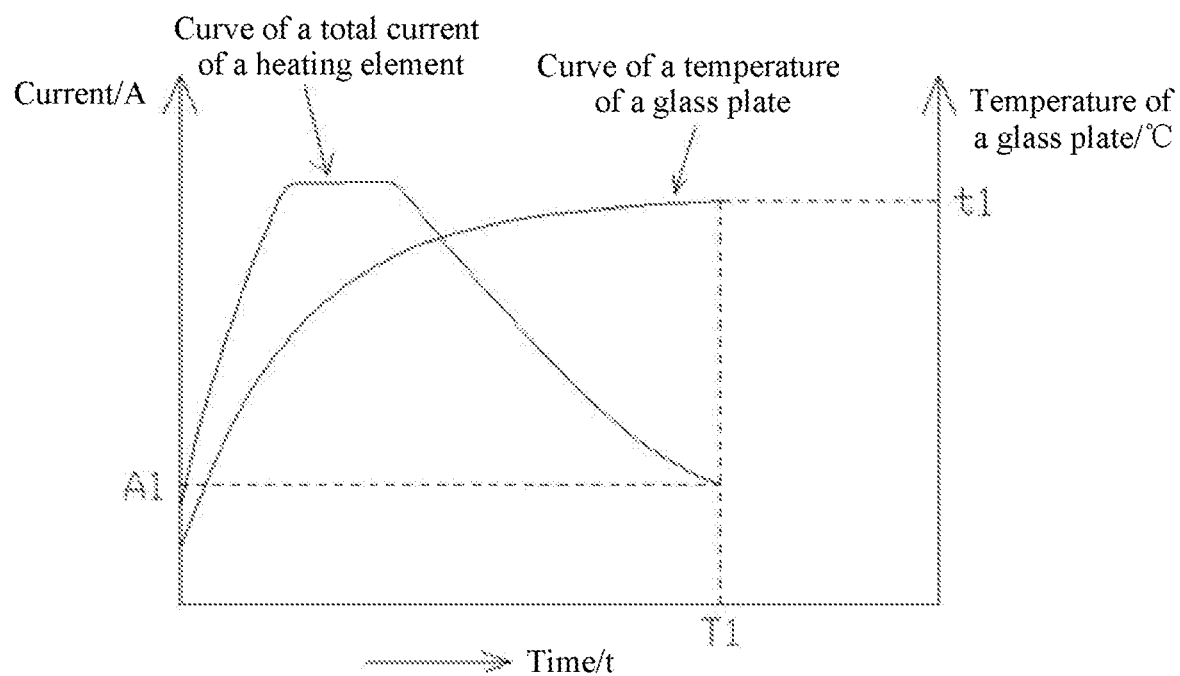
FIG. 2 is a variation curve diagram of a total current of an electric heating element according to the present disclosure.

As shown in FIG. 2, using a total current of an electric heating element as an example, a control process of a heating control method of the present disclosure is as follows:

First, a to-be-used heating furnace is determined, a working temperature of the heating furnace is adjusted according to a type of a to-be-heated glass plate (for example, a low-radiation coated glass plate or white glass) and thickness information. The heating furnace is run to reach the working temperature in a no-load state where an ambient temperature is room temperature. A total current of the heating element in the state is monitored, five total currents at different moments are measured, and an average of the five values is obtained, where the average is a standard threshold $A_0$. An ambient temperature is measured, and a correction coefficient is determined with reference to a correction coefficient table (a correction coefficient K in the table is obtained by using the following calculation method: respectively monitoring total current values of the heating element when the heating furnace is run to reach the working temperature in a no-load state at different ambient temperatures, and dividing each total current value by $A_0$). A threshold is calculated according to the correction coefficient K and $A_0$ through a formula: the threshold $A_1=A_0 \cdot K$, and the operator inputs the threshold $A_1$ into a control unit through a human-machine interface.

After the glass plate is fed into the heating furnace, the total current of the heating element is monitored by an ammeter in real time. Because the glass plate starts to absorb heat when entering the heating furnace from a lower temperature state, a temperature in the heating furnace is lowered at this moment. To keep a constant-temperature working state of the heating furnace, a quantity of heating elements in a working state is increased to provide more heat. In this case, a total heating current of the heating element increases rapidly, reaches a maximum value within a specific period of time, and then remains unchanged. As the temperature of the glass plate is gradually increased, a difference between the temperature of the glass plate and temperature in the furnace is gradually reduced. In this case, a speed at which the glass plate absorbs the heat in the heating furnace is reduced, the temperature of the glass plate in the heating furnace tends to be constant, a quantity of the heating elements in the working state is gradually reduced, and the total current of the heating element is gradually reduced. When the electricity meter connected to the heating element detects that the total current of the heating element is less than or equal to a specified threshold A1 for a second time, the detected total current of the heating element in a falling process is less than or equal to the specified threshold A1. In this case, a corresponding moment T1 when the glass plate is heated to a suitable temperature t1 that satisfies the tempering technology is determined, as shown in FIG. 2 (a curve in the figure is a curve diagram after filtering is performed on a data curve according to a change of the detected total current of the heating element). That is, at a moment T1, a control unit sends an instruction to a drive mechanism to move the glass plate out of the heating furnace, so as to complete the heating process and enter a next procedure.

Embodiment 3

Figure 3:
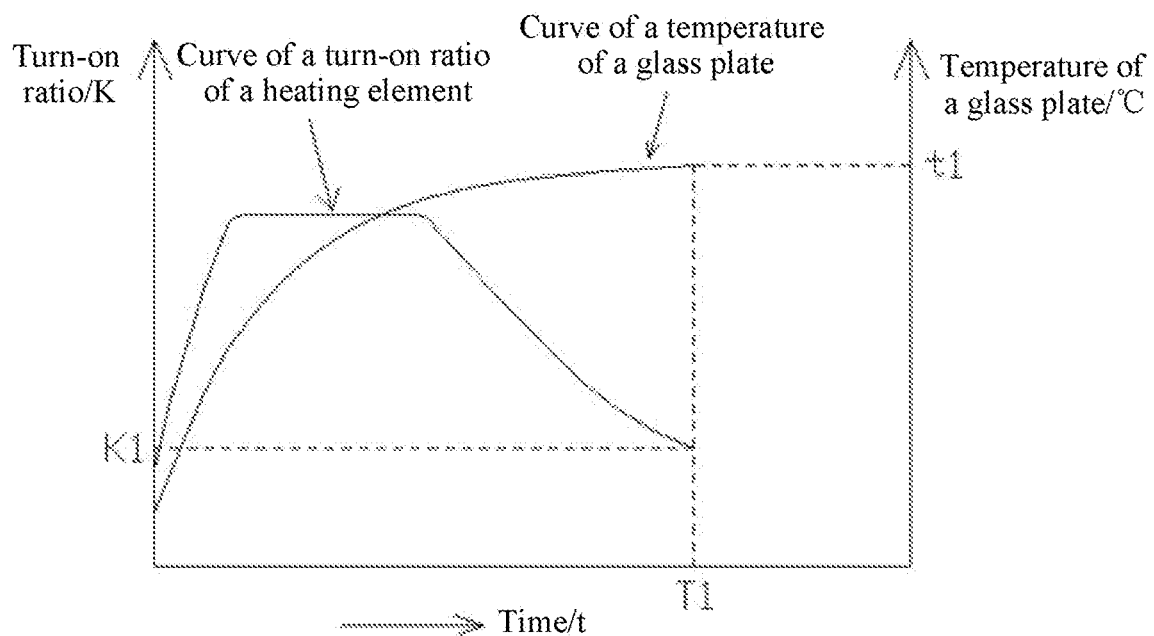
FIG. 3 is a variation curve diagram of a turn-on ratio of an electric heating element according to the present disclosure.

As shown in FIG. 3, using a turn-on ratio of an electric heating element as an example, a control process of a heating control method of the present disclosure is as follows:

First, a to-be-used heating furnace is determined, a working temperature of the heating furnace is adjusted according to a type of a to-be-heated glass plate (for example, a low-radiation coated glass plate or white glass) and thickness information. The heating furnace is run to reach the working temperature in a no-load state where an ambient temperature is room temperature. A turn-on ratio of the heating element in the state is monitored, five turn-on ratios at different moments are measured, and an average of the five values is obtained, where the average is a standard threshold $K_0$. An ambient temperature is measured, and a correction coefficient is determined with reference to a correction coefficient table (a correction coefficient K in the table is obtained by using the following calculation method: respectively monitoring turn-on ratios of the heating element when the heating furnace is run to reach the working temperature in a no-load state at different ambient temperatures, and dividing each turn-on ratio by $K_0$). A threshold is calculated according to the correction coefficient K and $K_0$ through a formula: the threshold $K_1=K_0 \cdot K$, and the operator inputs the threshold $K_1$ into a control unit through a human-machine interface.

After the glass plate is fed into the heating furnace, the turn-on ratio of the heating element is calculated by running a formula: the quantity of the heating elements in the working state/the total quantity of the heating elements, after the quantity of the heating elements in the working state is detected by the monitoring unit in real time. Because the glass plate starts to absorb heat when entering the heating furnace from a lower temperature state, a temperature in the heating furnace is lowered at this moment. To keep a constant-temperature working state, a quantity of heating elements in a working state is increased to provide more heat. In this case, the turn-on ratio of the heating element increases rapidly, reaches a maximum value within a specific period of time, and then remains unchanged. As the temperature of the glass plate is gradually increased, a difference between the temperature of the glass plate and temperature in the furnace is gradually reduced. In this case, a speed at which the glass plate absorbs the heat in the heating furnace is reduced, the temperature of the glass plate in the heating furnace tends to be constant, a quantity of the heating elements in the working state is gradually reduced, and the turn-on ratio of the heating element is gradually reduced. When the turn-on ratio of the heating element is less than or equal to a specified threshold $K_1$ again, the detected turn-on ratio of the heating element in a falling process is less than or equal to the specified threshold $K_1$. In this case, a corresponding moment T1 when the glass plate is heated to a suitable temperature t1 that satisfies the tempering technology is determined, as shown in FIG. 3 (a curve in the figure is a curve diagram after filtering is performed on a data curve according to a change of the turn-on ratio of the detected heating element). That is, at a moment T1, a control unit sends an instruction to a drive mechanism to move the glass plate out of the heating furnace, so as to complete the heating process and enter a next procedure.

Embodiment 4

Figure 4:
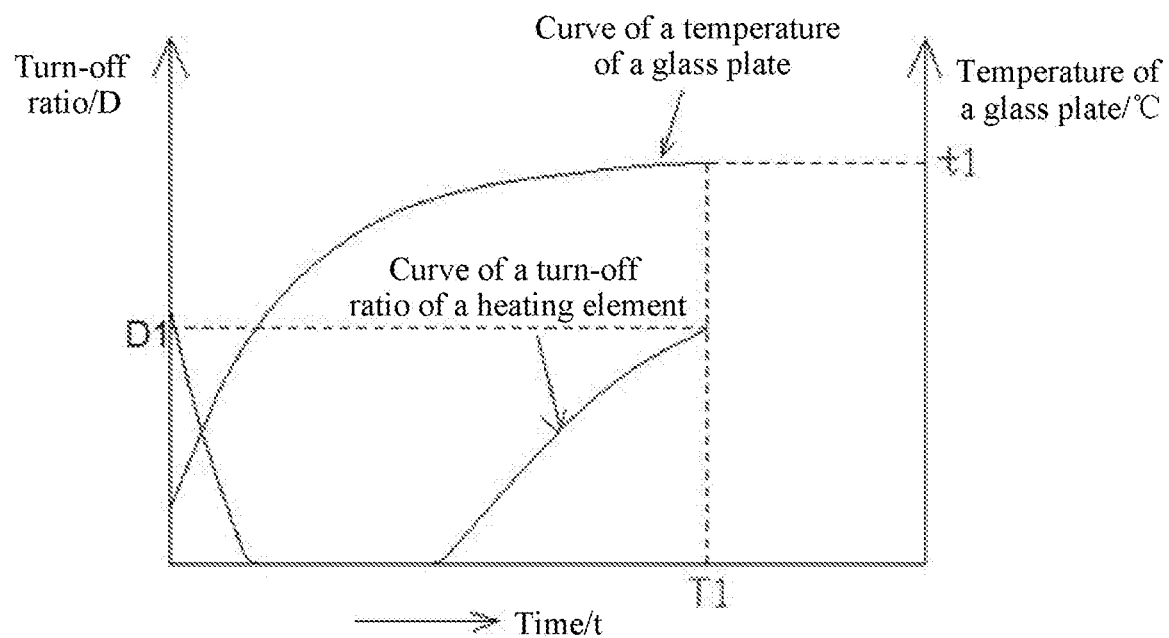
FIG. 4 is a variation curve diagram of a turn-off ratio of an electric heating element according to the present disclosure.

As shown in FIG. 4, using a turn-off ratio of an electric heating element as an example, a control process of a heating control method of the present disclosure is as follows:

First, a to-be-used heating furnace is determined, a working temperature of the heating furnace is adjusted according to a type of a to-be-heated glass plate (for example, a low-radiation coated glass plate or white glass) and thickness information. The heating furnace is run to reach the working temperature in a no-load state where an ambient temperature is room temperature. A turn-off ratio of the heating element in the state is monitored, five turn-off ratios at different moments are measured, and an average of the five values is obtained, where the average is a standard threshold $D_0$. An ambient temperature is measured, and a correction coefficient is determined with reference to a correction coefficient table (a correction coefficient K in the table is obtained by using the following calculation method: respectively monitoring turn-off ratios of the heating element when the heating furnace is run to reach the working temperature in a no-load state at different ambient temperatures, and dividing each turn-off ratio by $D_0$). A threshold is calculated according to the correction coefficient K and $D_0$ through a formula: the threshold $D_1 = D_0 \cdot K$, and the operator inputs the threshold $D_1$ into a control unit through a human-machine interface.

After the glass plate is fed into the heating furnace, the turn-off ratio of the heating element is calculated by running a formula: 1−(the quantity of the heating elements in the working state/the total quantity of the heating elements), after the quantity of the heating elements in the working state is detected by the monitoring unit in real time. Because the glass plate starts to absorb heat when entering the heating furnace from a lower temperature state, a temperature in the heating furnace is lowered at this moment. To keep a constant working state, a quantity of heating elements in a working state is increased to provide more heat. In this case, the turn-off ratio of the heating element decreases, reaches a minimum value within a specific period of time, and then remains unchanged. As the temperature of the glass plate is gradually increased, a difference between the temperature of the glass plate and temperature in the furnace is gradually reduced. In this case, a speed at which the glass plate absorbs the heat in the heating furnace is reduced, the temperature of the glass plate in the heating furnace tends to be constant, a quantity of the heating elements in the working state is gradually reduced, and the turn-off ratio of the heating element is gradually increased. When the turn-off ratio of the heating element is greater than or equal to a specified threshold $D_1$ again, the detected turn-off ratio of the heating element in a rising process is more than or equal to the specified threshold $D_1$. In this case, a corresponding moment T1 when the glass plate is heated to a suitable temperature t1 that satisfies the tempering technology is determined, as shown in FIG. 4 (a curve in the figure is a curve diagram after filtering is performed on a data curve according to a change of the turn-off ratio of the detected heating element). That is, at a moment T1, a control unit sends an instruction to a drive mechanism to move the glass plate out of the heating furnace, so as to complete the heating process and enter a next procedure.

Embodiment 5

Figure 5:
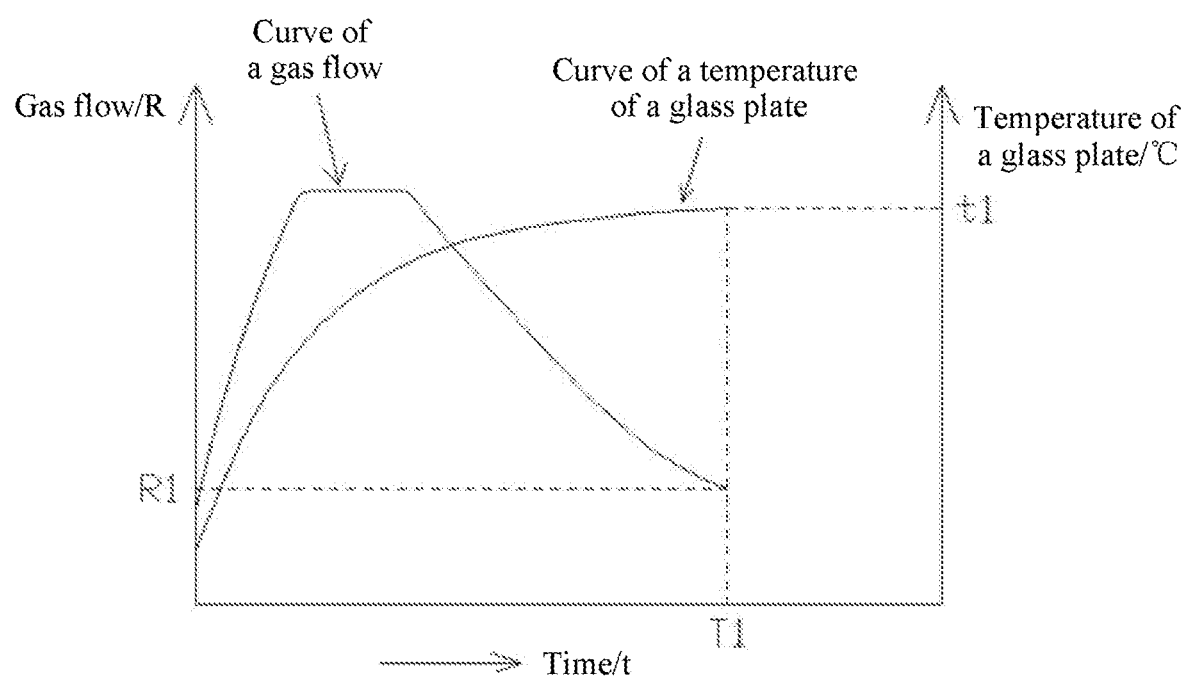
FIG. 5 is a variation curve diagram of a gas flow value of a gas heating element according to the present disclosure.

As shown in FIG. 5, using a gas flow value of a gas heating element as an example, a control process of a heating control method of the present disclosure is as follows:

First, a to-be-used heating furnace is determined, a working temperature of the heating furnace is adjusted according to a type of a to-be-heated glass plate (for example, a low-radiation coated glass plate or white glass) and thickness information. The heating furnace is run to reach the working temperature in a no-load state where an ambient temperature is room temperature. A gas flow value of the heating element in the state is monitored, five gas flow values at different moments are measured, and an average of the five values is obtained, where the average is a standard threshold $R_0$. An ambient temperature is measured, and a correction coefficient is determined with reference to a correction coefficient table (a correction coefficient K in the table is obtained by using the following calculation method: respectively monitoring gas flow values of the heating element when the heating furnace is run to reach the working temperature in a no-load state at different ambient temperatures, and dividing each gas flow value by $R_0$). A threshold is calculated according to the correction coefficient K and $R_0$ through a formula: the threshold $R_1 = R_0 \cdot K$, and the operator inputs the threshold $R_1$ into a control unit through a human-machine interface.

After the glass plate is fed into the heating furnace, the total gas flow value of the heating element is monitored by a gas flowmeter in real time. Because the glass plate starts to absorb heat when entering the heating furnace from a lower temperature state, a temperature in the heating furnace is lowered at this moment. To keep a constant-temperature working state of the heating furnace, a quantity of heating elements in a working state is increased to provide more heat. In this case, a gas flow value of the heating element increases rapidly, reaches a maximum value within a specific period of time, and then remains unchanged. As the temperature of the glass plate is gradually increased, a difference between the temperature of the glass plate and temperature in the furnace is gradually reduced. In this case, a speed at which the glass plate absorbs the heat in the heating furnace is reduced, the temperature of the glass plate in the heating furnace tends to be constant, a quantity of the heating elements in the working state is gradually reduced, and the gas flow value is gradually reduced. When the gas flowmeter connected to the heating element detects that the gas flow value of the heating element is less than or equal to a specified threshold $R_1$ again, the detected gas flow value detected in a falling process is less than or equal to the specified threshold $R_1$. In this case, a corresponding moment T1 when the glass plate is heated to a suitable temperature t1 that satisfies the tempering technology is determined, as shown in FIG. 5 (a curve in the figure is a curve diagram after filtering is performed on a data curve according to a change of the total gas flow value of the detected heating element). That is, at a moment T1, a control unit sends an instruction to a drive mechanism to move the glass plate out of the heating furnace, so as to complete the heating process and enter a next procedure.

The threshold $W_1$, $A_1$, $K_1$, $D_1$, and $R_1$ in foregoing Embodiment 1 to Embodiment 5 can be further obtained by using the following method: the operator inputs the correction coefficient K into the control unit through a human-machine interface, and the control unit calculates corresponding thresholds according to formulas.

It is to be noted that: the "room temperature" in the present disclosure refers to 25° C., but a person skilled in the art will easily think of replacing "room temperature" with other temperatures, to obtain a corresponding standard threshold.

The technical solutions and embodiments of the present disclosure are not limited thereto, and the same or equivalent effects as those exemplified in the present disclosure fall within the scope of the present disclosure.

What is claimed is:

1. A method for controlling discharging of a glass plate in a glass plate tempering technology process, using a heating furnace configured to heat a glass plate, wherein the heating furnace comprises a monitoring unit, a control unit, and a drive mechanism, the method comprising:
   upon determining that the heating furnace is run to reach a working temperature in a no-load state, inputting a corresponding value of a working parameter of a heating element to the control unit to set a threshold;
   performing a filtering on a detected working parameter of the heating element detected by the monitoring unit to obtain a filtered working parameter, in a process of heating the glass plate in the furnace after the glass plate is fed into the heating furnace;
   transmitting the filtered working parameter of the heating element to the control unit;
   comparing the filtered working parameter of the heating element with the threshold by the control unit;
   sending an instruction to the drive mechanism by the control unit when the filtered working parameter of the heating element reaches the threshold after the filtered working parameter of the heating element reaches and passes a maximum value or a minimum value, wherein neither the maximum value nor the minimum value is equal to the threshold; and
   acting to directly move the glass plate out of the heating furnace or move the glass plate out of the heating furnace after a time delay by the drive mechanism, so as to complete a glass plate heating process;
   wherein the working parameter, the detected working parameter, and the filtered working parameter are one of: a total power of the heating element, a total current value of the heating element, a turn-on ratio of the heating element, a turn-off ratio of the heating element, or a gas flow value of the heating element.

2. The method for controlling discharging of a glass plate in a glass plate tempering technology process according to claim 1, wherein:
   an electric heating element is adopted as the heating element, and the working parameter of the heating element is the total power of the heating element in the heating furnace;
   after the glass plate is fed into the heating furnace, the monitoring unit monitors the total power of the heating element in real time, performs filtering on the total power of the heating element to obtain a filtered total power of the heating element, and transmits the filtered total power of the heating element to the control unit to compare the filtered total power with a specified threshold $W_1$;
   after the filtered total power of the heating element reaches the maximum value, and upon determining that the filtered total power is less than or equal to the threshold $W_1$ during a falling process, the control unit sends the instruction to the drive mechanism; and
   the drive mechanism acts to directly move the glass plate out of the heating furnace or move the glass plate out of the heating furnace after a time delay, so as to complete the glass plate heating process.

3. The method for controlling discharging of a glass plate in a glass plate tempering technology process according to claim 2, wherein the monitoring unit is an electricity meter.

4. The method for controlling discharging of a glass plate in a glass plate tempering technology process according to claim 2, wherein the threshold is $W_1 = W_0 \cdot K$,
   wherein K is a correction coefficient with a value range that $0.9 \leq K \leq 1.1$, and $W_0$ is a total power of the heating element upon determining that the heating furnace reaches the working temperature in the no-load state at room temperature.

5. The method for controlling discharging of a glass plate in a glass plate tempering technology process according to claim 1, wherein:
   an electric heating element is adopted as the heating element, and the working parameter of the heating element is the total current value of the heating element in the heating furnace;
   after the glass plate is fed into the heating furnace, the monitoring unit monitors the total current value of the heating element in real time, performs filtering on the total current value of the heating element to obtain a filtered total current value of the heating element, and transmits the filtered total current value to the control unit to compare the filtered total current value with a specified threshold $A_1$;
   after the filtered total current value of the heating element reaches the maximum value, and upon determining that the filtered total current value is less than or equal to the threshold $A_1$ during a falling process, the control unit sends the instruction to the drive mechanism; and
   the drive mechanism acts to directly move the glass plate out of the heating furnace or move the glass plate out of the heating furnace after a time delay, so as to complete the glass plate heating process.

6. The method for controlling discharging of a glass plate in a glass plate tempering technology process according to claim 5, wherein the monitoring unit is an ammeter.

7. The method for controlling discharging of a glass plate in a glass plate tempering technology process according to claim 5, wherein the threshold is $A_1 = A_0 \cdot K$,
   wherein K is a correction coefficient with a value range that $0.9 \leq K \leq 1.1$, and $A_0$ is a total current value of the heating element upon determining that the heating furnace reaches the working temperature in the no-load state at room temperature.

8. The method for controlling discharging of a glass plate in a glass plate tempering technology process according to claim 1, wherein:

an electric heating element or a gas heating element is adopted as the heating element, and a working parameter of the heating element is a turn-on ratio of all heating elements in the heating furnace; the turn-on ratio of the heating element is a percentage of a quantity of the heating elements in a working state in a quantity of all heating elements;

after the glass plate is fed into the heating furnace, the monitoring unit monitors the turn-on ratio of the heating element in real time, performs filtering on the turn-on ratio of the heating element to obtain a filtered turn-on ratio of the heating element, and transmits the filtered turn-on ratio to the control unit to compare the filtered turn-on ratio with a threshold $K_1$;

after the filtered turn-on ratio of the heating element reaches the maximum value, and upon determining that the filtered turn-on ratio is less than or equal to the threshold $K_1$ during a falling process, the control unit sends the instruction to the drive mechanism; and the drive mechanism acts to directly move the glass plate out of the heating furnace or move the glass plate out of the heating furnace after a time delay, so as to complete the glass plate heating process.

9. The method for controlling discharging of a glass plate in a glass plate tempering technology process according to claim 8, wherein the turn-on ratio is calculated by running a formula: the quantity of the heating elements in the working state divided by the quantity of all heating elements, after the quantity of the heating elements in the working state is detected by the monitoring unit.

10. The method for controlling discharging of a glass plate in a glass plate tempering technology process according to claim 8, wherein the threshold is $K_1 = K_0 \cdot K$, wherein K is a correction coefficient with a value range that $0.9 \leq K \leq 1.1$, and $K_0$ is a turn-on ratio of the heating element upon determining that the heating furnace reaches the working temperature in the no-load state at room temperature.

11. The method for controlling discharging of a glass plate in a glass plate tempering technology process according to claim 1, wherein:

either an electric heating element or a gas heating element is adopted as the heating element, and a working parameter of the heating element is a turn-off ratio of all heating elements in the heating furnace; the turn-off ratio of the heating element is a percentage of a quantity of the heating elements in an off state in a quantity of all heating elements;

after the glass plate is fed into the heating furnace, the monitoring unit monitors the turn-off ratio of the heating element in real time, performs filtering on the turn-off ratio of the heating element to obtain a filtered turn-off ratio of the heating element, and transmits the filtered turn-off ratio to the control unit to compare the filtered turn-off ratio with a threshold $D_1$;

after the filtered turn-off ratio of the heating element reaches the minimum value, and upon determining that the filtered turn-off ratio is greater than or equal to the threshold $D_1$ during a rising process, the control unit sends the instruction to the drive mechanism; and the drive mechanism acts to directly move the glass plate out of the heating furnace or move the glass plate out of the heating furnace after a time delay, so as to complete the glass plate heating process.

12. The method for controlling discharging of a glass plate in a glass plate tempering technology process according to claim 11, wherein the turn-off ratio is calculated by running a formula: 1−a quantity of the heating elements in the working state divided by the quantity of all heating elements, after the quantity of the heating elements in the working state is detected by the monitoring unit.

13. The method for controlling discharging of a glass plate in a glass plate tempering technology process according to claim 11, wherein the threshold is $D_1 = D_0 \cdot K$, wherein K is a correction coefficient with a value range that $0.9 \leq K \leq 1.1$, and $D_0$ is a turn-off ratio of the heating element upon determining that the heating furnace reaches the working temperature in the no-load state at room temperature.

14. The method for controlling discharging of a glass plate in a glass plate tempering technology process according to claim 1, wherein:

a gas heating element is adopted as the heating element, and a working parameter of the heating element is the gas flow value of the heating element in the heating furnace;

after the glass plate is fed into the heating furnace, the monitoring unit monitors the gas flow value of the heating element in real time, performs filtering on the gas flow value to obtain a filtered gas flow value, and transmits the filtered gas flow value to the control unit to compare the filtered gas flow value with a specified threshold $R_1$;

after the filtered gas flow value of the heating element reaches the maximum value, and upon determining that the filtered flow value is less than or equal to the threshold $R_1$ during a falling process, the control unit sends the instruction to the drive mechanism; and the drive mechanism acts to directly move the glass plate out of the heating furnace or move the glass plate out of the heating furnace after a time delay, so as to complete the glass plate heating process.

15. The method for controlling discharging of a glass plate in a glass plate tempering technology process according to claim 14, wherein the monitoring unit is a gas flowmeter.

16. The method for controlling discharging of a glass plate in a glass plate tempering technology process according to claim 14, wherein the threshold $R_1 = R_0 \cdot K$, wherein K is a correction coefficient with a value range that $0.9 \leq K \leq 1.1$, and $R_0$ is a gas flow value of the heating element upon determining that the heating furnace reaches the working temperature in the no-load state at room temperature.

17. The method for controlling discharging of a glass plate in a glass plate tempering technology process according to claim 1, wherein the threshold is input to the control unit manually through a human-machine interface.

18. The method for controlling discharging of a glass plate in a glass plate tempering technology process according to claim 1, wherein the filtering is a digital filtering or an analog filtering.

* * * * *